United States Patent [19]

De Mesmaeker

[11] 4,222,085
[45] Sep. 9, 1980

[54] METHOD AND APPARATUS FOR THE DISTANCE-SELECTIVE FAULT MONITORING OF ELECTRICAL LINES

[75] Inventor: Ivan De Mesmaeker, Fislisbach, Switzerland

[73] Assignee: BBC, Brown Boveri & CIE., Baden, Switzerland

[21] Appl. No.: 936,943

[22] Filed: Aug. 25, 1978

[30] Foreign Application Priority Data

Sep. 6, 1977 [CH] Switzerland .................. 10836/77

[51] Int. Cl.$^2$ .................. H02H 7/26; H02H 3/26
[52] U.S. Cl. .................. 361/80; 361/85
[58] Field of Search .............. 361/80, 85, 82, 81, 361/84, 79, 78, 83, 86, 93, 94; 307/355, 232; 328/133

[56] References Cited

U.S. PATENT DOCUMENTS

| | | | |
|---|---|---|---|
| 2,981,867 | 4/1961 | Hopkins et al. | 361/82 |
| 3,413,523 | 11/1968 | Hoel | 361/80 |
| 3,475,655 | 10/1969 | Suzuki | 361/80 |
| 3,644,788 | 2/1972 | Maenicke | 361/80 |

FOREIGN PATENT DOCUMENTS

2351872 4/1974 Fed. Rep. of Germany ............. 361/80

OTHER PUBLICATIONS

"Protective Relaying System for 500 kv Transmission Line", by OHTA et al, 1975, Mar. pp. 361-368, I.N.S.-P.E.C.

Primary Examiner—Patrick R. Salce
Attorney, Agent, or Firm—Werner W. Kleeman

[57] ABSTRACT

A method of, and apparatus for, the distance-selective monitoring of faults at electrical lines by means of a quadrilateral trigger or trip region. There are formed at least two reference signals of at least approximately the same phase and from each of these reference signals and the line voltage there is formed a respective difference signal. Each difference signal experiences a separate comparison with a related threshold phase angle in order to determine whether the monitored fault lies within or without the trip region.

11 Claims, 3 Drawing Figures

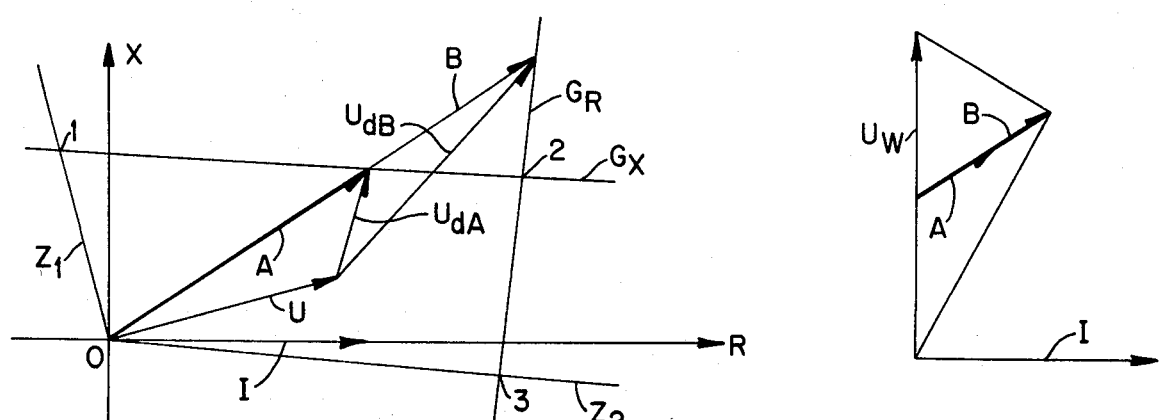
Fig. 1
Fig. 2
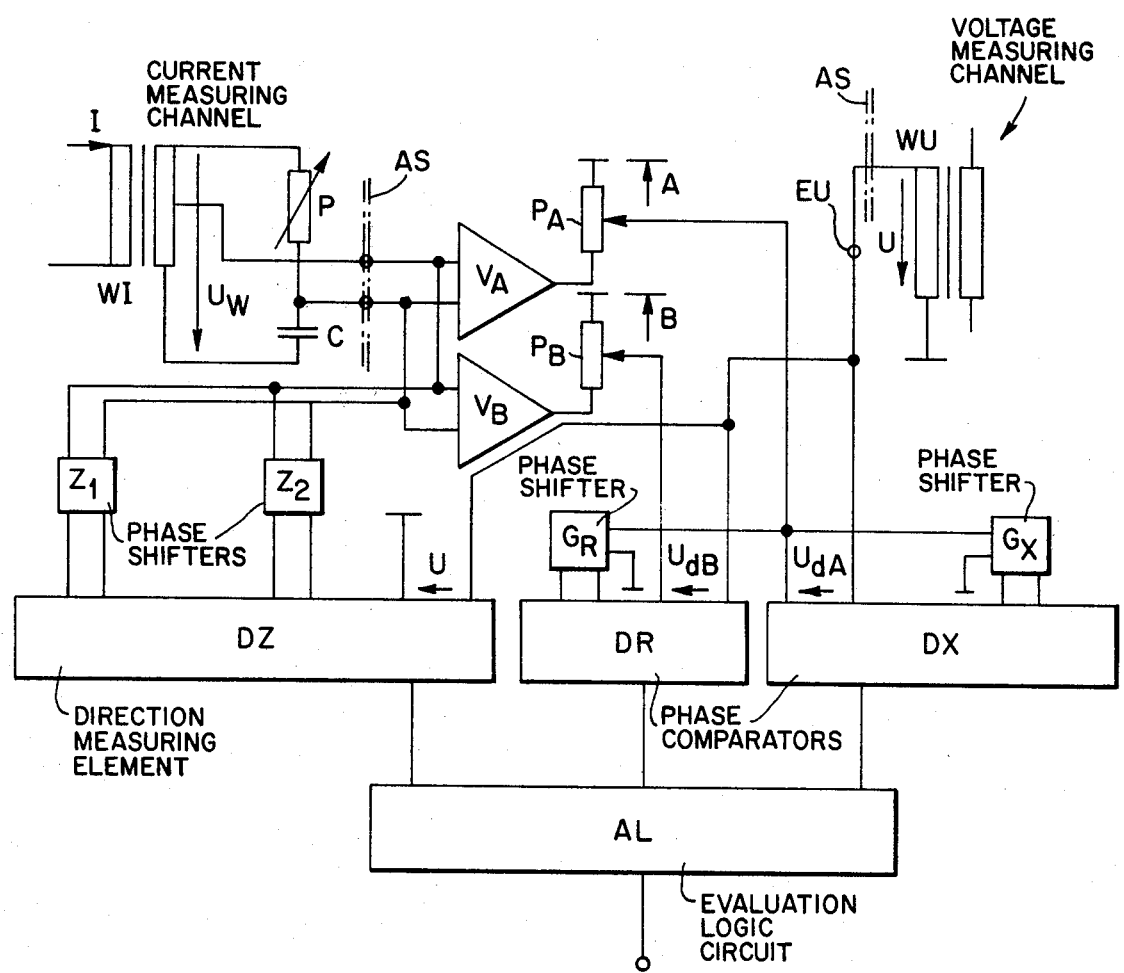
Fig. 3

METHOD AND APPARATUS FOR THE DISTANCE-SELECTIVE FAULT MONITORING OF ELECTRICAL LINES

BACKGROUND OF THE INVENTION

The present invention relates to a new and improved method of, and apparatus for, the distance-selective fault monitoring of electrical lines or the like.

Generally speaking, the method and apparatus for the distance-selective monitoring of faults at electrical lines employs a quadrilateral trigger or trip region. There is formed a respective difference signal between the line voltage and always one of a number of reference signals which are obtained by means of corresponding reference impedances from the line current. The thus formed difference signals are subjected to phase angle monitoring with regard to predetermined threshold phase angles.

In German Pat. No. 1,947,037 there is taught a method and apparatus of the aforementioned type for monitoring faults. There are employed for the determination of the reactance boundary, i.e., the boundary or boundary section of the trigger or trip region which essentially determines the extent of the trigger region in the direction of the reactance axis of the impedance plane, and for the determination of the resistance boundary i.e., the boundary or boundary section which essentially determines the extent of the trigger or trip region in the direction of the resistance axis of the impedance plane, two mutually phase shifted reference signals each having a respective associated current converter and phase shift element. Furthermore, different voltage transformer-secondary windings serve for the formation of the corresponding difference signals from the line voltage. The thus required circuit expenditure also must be provided in the case of multiple use of the system with selective switching of a measuring system for different lines or phases of a multi-phase line system for the different lines.

SUMMARY OF THE INVENTION

Hence, with the foregoing in mind, it is a primary object of the present invention to provide an improved method of, and apparatus for, monitoring faults by means of a quadrilateral trigger or trip region with comparatively low circuit expenditure.

A further significant object of the present invention relates to a new and improved method of, and apparatus for, effectively monitoring faults at electrical lines or networks in a highly efficient, reliable and accurate manner.

Still a further noteworthy object of the present invention concerns an improved method of, and apparatus for, monitoring faults at electrical lines in an extremely accurate and reliable manner with reduced equipment expenditure in relation to prior art systems heretofore proposed and working with a quadrilateral trigger or trip region.

Now in order to implement these and still further objects of the invention which will become more readily apparent as the description proceeds, the method for the distance-selective monitoring of faults at electrical lines by means of a quadrilateral trip or trigger region contemplates forming at least two at least approximately phase similar reference signals, forming a respective difference signal from each of these reference signals and the line voltage, and each such difference signal is subjected to a separate comparison with a related threshold phase angle.

As already alluded to above, the invention is not only concerned with the aforementioned method aspects, but also relates to apparatus for the performance thereof, wherein there is only provided a respective measuring channel for the line current and for the line voltage in order to determine the resistance boundary or threshold and the reactance boundary or threshold of the trigger or trip region, and the line current-measuring channel is equipped with a phase shift element for determining the phase of the reference signals.

The inventive solution exploits the recognition that the resistance boundary and the reactance boundary important for the determination of the quadrilateral trigger or trip region can be freely fixed by means of two reference signals of essentially the same phase, i.e., reference signals which only differ in amplitude and corresponding difference signals by means of the line voltage if the threshold phase angle monitoring of such difference signals is carried out with threshold or comparison phase angles accommodated to the direction of the aforementioned boundaries or boundary sections. In each case the tip of the reference signal vector in the impedance plane is located at one of both thresholds or boundaries and thus determines their shifted position. The position of the aforementioned boundaries therefore can be advantageously simply attained by changing the amplitude of the reference signals.

BRIEF DESCRIPTION OF THE DRAWINGS

The invention will be better understood and objects other than those set forth above, will become apparent when consideration is given to the following detailed description thereof. Such description makes reference to the annexed drawing wherein:

FIG. 1 illustrates an example of a quadrilateral trigger or trip region in the impedance plane;

FIG. 2 is a vector diagram for obtaining the reference signals; and

FIG. 3 is a principle circuit diagram of an apparatus for fault monitoring constructed according to the teachings of the present invention.

DETAILED DESCRIPTION OF THE PREFERRED EMBODIMENTS

Describing now the drawings, as to the impedance plane shown in FIG. 1 and having a real axis R and an imaginary axis X the vector of the line current I is positioned as a phase angle-reference magnitude in the real axis, whereas the line voltage U forms therewith an angle which is dependent upon the operating or fault condition, respectively. The quadrilateral trigger or trip region is defined by the vertices or corner points O (coordinate null point), 1, 2 and 3. A position of the vector tip of the line voltage U within such trigger or trip region 0-1-2-3 constitutes the fault criterion, whereas a position of the vector tip of the line voltage U without or externally of such trigger or trip region 0-1-2-3 i.e., the linear or boundary sections between the aforementioned corner points, characterize a fault-free operating state. The line $G_X$ bounding the trigger region 0-1-2-3 essentially in the direction of the imaginary axis X is designated as the reactance boundary or threshold, whereas the line $G_R$ bounding such trigger or trip region 0-1-2-3 essentially in the direction of the real axis R is designated as the resistance boundary or threshold.

The thresholds or boundaries $Z_1$ and $Z_2$ which are only slightly inclined in relation to the imaginary axis X and the real axis R and extending through the coorindate null point, essentially have the function of a directional determination of the power or current flow at the line with respect to the measuring location and are conveniently designated as directional boundaries or thresholds. By virtue of the dependency of the line voltage vector U as a function of magnitude and direction with regard to the distance of the fault location from the measuring location there results the distance selectivity of the triggering or tripping criterion.

In order to carry out fault monitoring there are formed the two reference signals A and B of the same phase and having a fixed phase with respect to the line current I and amplitudes which are likewise fixed with respect to the line current I, and furthermore, by using the line voltage U there are formed and related or corresponding difference signals $U_{dA}$ and $U_{dB}$. By comparing the phase angle of such difference signals $U_{dA}$ and $U_{dB}$ with predetermined threshold or boundary phase angles there can be obtained unambiguous determinations regarding the position of the vector tip of the line voltage U within or without those boundaries $G_R$ or $G_X$ which extend through the vector tips of the reference signals A and B related to the corresponding difference signals $U_{dA}$ and $U_{dB}$, respectively.

There is thus determined the displacement or shifted position, for instance characterized by the intersection point with the imaginary axis X or the real axis R, for each thus fixed trigger or trip boundary by the position of the vector tip of an associated reference signal, and thus, each such trigger boundary is determined independently of every other reference signal simply by carrying out an amplitude adjustment of the reference signals A and B. The direction of a threshold or boundary passing through the vector tip of a reference signal is accordingly determined by the threshold phase angle with which there is compared the related difference signal. Since these threshold phase angles are freely selectable—whether it be by forming comparison signals which themselves have an appropriate phase, directly followed by phase comparison of a difference signal and its comparison signal or by the formation of a comparison signal having a phase angle differing from the direction of the relevant trigger boundary and incorporation of a supplementary angle during phase comparison between the difference signal and the comparison signal—it is therefore possible to fix or interchange not only the exact directional determination of the thresholds or boundaries, but also their characteristics as reactance boundary or resistance boundary.

If, for instance, there is selected the threshold phase angle for $U_{dA}$, as assumed in FIG. 1, to be approximately null with respect to R or I, respectively, then there is thus fixed the boundary extending through the tip of the vector of the reference signal A as the reactance boundary or threshold, which has been designated by reference character $G_X$ in the example under discussion. On the other hand, if, for instance, the threshold phase angle for the difference signal $U_{dA}$ is chosen to be approximately 90° with regard to the axis R or null with regard to the axis X, then there is thus fixed the boundary or threshold, as the resistance threshold, which extends through the tip of the vector of the reference signal A. Of course this holds correspondingly true for the threshold extending through the tip of the vector of the reference signal B, which, in the example under discussion, with a threshold phase angle of approximately null with respect to the axis X or 90° with respect to the axis R has been obtained for the threshold phase comparison of the difference signal $U_{dB}$, and therefore, constitutes the resistance threshold or boundary $G_R$. Of course there can be adjusted random directions of both boundaries or thresholds between the aforementioned cases, and generally, there no longer prevail fixed or unambiguous correlations as concerns the enclosing or bounding of the trigger region in the reactance direction and resistance direction, respectively. As will be recognized from the foregoing, thus there can be realized by means of reference signals of the same phase randomly positioned and directed trigger boundaries which do not extend through the coordinate null point.

FIG. 2 illustrates in the vector diagram thereof a possibility of forming reference signals A and B of the same phase from the output voltage $U_W$, essentially at right angles to the line current I, of a conventional current-voltage converter by tapping-off, on the one hand, between the partial voltages of $U_W$ and the partial voltages (not further designated) of a conventional, orthagonal phase shifting element or phase shifter, on the other hand. By altering the phase of the phase shifting element it is possible to set the phase of the reference signals or voltages A and B without any amplitude change when signal tap-off is accomplished at one-half of the voltage $U_W$.

The circuitry shown in FIG. 3 enables forming the reference signals A and B, according to FIG. 2, by means of only one current measuring channel embodying a current-voltage converter WI with center tap of the secondary thereof and having connected in circuit therewith a phase shifting element or phase shifter means P, C composed of a potentiometer P and a capacitor C. A common phase-determining output magnitude for the formation of both reference signals A and B is tapped-off between the center tap of the secondary winding of the current-voltage converter WI and the circuit junction or terminal between the potentiometer P and the capacitor C. These signals are delivered in parallel to two amplifiers $V_A$ and $V_B$ having potentiometers $P_A$ and $P_B$ connected at the respective output sides thereof, and serving as the amplitude-determining elements. At the taps of the potentiometers $P_A$ and $P_B$ there are available the reference signals A and B of the same phase and having selectable amplitude.

The difference signals $U_{dA}$ and $U_{dB}$ are produced by opposed coupling of the reference signals A and B with the line voltage U obtained in a further measuring channel containing a voltage converter WU and these difference signals are infed to a respective phase comparator DX and DR, respectively. The threshold phase angles, which as above-explained determine the direction of the reactance threshold $G_X$ and the resistance threshold $G_R$ are derived by means of conventional and therefore merely schematically illustrated phase shifting elements or phase shifters which have been likewise conveniently designated by reference character $G_X$ and $G_R$, from a common reference signal, which in the embodiment under discussion is for example the reference signal A. In principle, however, there can be used as the reference signal for obtaining the threshold phase angles every other signal having a defined phase in relation to the line current I, for instance the output signal of the current-voltage converter WI.

Threshold phase angle monitoring is accomplished in the phase comparators DX and DR in such a manner that in each case, as a function of the position of the vector tip of the line voltage U within or without the boundaries $G_X$ and $G_R$, respectively, there is delivered a binary signal to an evaluation logic circuit AL which, for instance, carries out conjunctive or AND compounding. The latter furthermore receives a binary signal as a function of the phase of the line voltage U within or without the smaller angle (open in the direction of the trigger region) between the directional boundaries or thresholds $Z_1$ and $Z_2$ which likewise are determined by appropriate reference signals or vectors. In the embodiment under discussion the latter are formed in the directional measuring system embodying two phase shifting elements which, for the sake of convenience have likewise been designated by reference characters $Z_1$ and $Z_2$, from the phase of the reference signals A and B, and specifically, from the input of the amplifiers $V_A$ and $V_B$. A direction measuring element DZ, which apart from receiving the directional boundaries $Z_1$ and $Z_2$ also receives the line voltage U, and carries out the phase comparison in accordance with the direction of the line voltage U with respect to the directional boundaries $Z_1$ and $Z_2$ and delivers the previously mentioned direction-binary signal to the evaluation logic circuit AL. As above indicated, the latter essentially carries out a total conjunctive logical linking or coupling i.e., AND compounding of the infed binary signals and delivers at its output a characteristic signal for the position of the vector tip of the line voltage U within or without the trigger or trip region 0-1-2-3 which is now bounded at all sides.

A particularly notable advantage of the illustrated circuitry resides in the fact that for one measuring system which completely determines the quadrilateral trigger or trip region there is only required one current measuring channel and one voltage measuring channel, as above explained. This constitutes an appreciable reduction in the circuit expenditure. Additionally, the connection of only one simple phase shifting element at the current converter facilitates the use of current-voltage converters having an air gap as the input converter. These converters, owing to their low overdimensioning factor which is basically advantageous, however render more difficult the utilization of reference impedances with different phase angles and especially those with small phase angles. This difficulty is overcome by the use of the proposed circuit.

A further advantage is afforded with the exemplary embodiment under discussion, by virtue of the derivation of the threshold phase angles from the output of the phase shifting element at the input converter and particularly from the reference signals A or B i.e. from only one of them. This measure renders possible, especially in contrast to derivation of the threshold phase angles from a converter output magnitude, extremely simple switching of the measuring system, i.e., the inputs of the amplifiers $V_A$ and $V_B$ and the line voltage input EU between phase lines of a multi-phase system and which phase lines are correlated to different converter units, as a function of the fault determinative selection. The corresponding switching locations, which as should be apparent encompass only a few measuring lines and appropriate contacts, have been simply schematically indicated in FIG. 3 and designated by reference character AS.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method for the distance-selective monitoring of faults at electrical lines by means of a quadrilateral trip region, comprising the steps of:
   deriving from the line current by means of reference impedances at least two reference signals of at least approximately the same phase;
   forming from each reference signal and the line voltage a respective difference signal;
   separately comparing each difference signal with a respective correlated threshold phase angle;
   each respective threshold phase angle differing from one another;
   one of the threshold phase angles defines the angular position of a resistance boundary of the quadrilateral trip region; and
   the other of said threshold phase angles defines the angular position of a reactance boundary of the quadrilateral trip region.

2. The method as defined in claim 1, further including the steps of:
   deriving each said threshold phase angle for monitoring the related difference signal by carrying out a different phase shift of one of the reference signals through respectively different phase angles.

3. The method as defined in claim 1, wherein: comparison of each difference signal with a correlated threshold phase angle determines whether a fault condition is located within or without the quadrilateral trip region.

4. The method as defined in claim 1, wherein: the two reference signals are essentially in-phase and have different amplitudes.

5. A method of the distance-selective monitoring of faults at electrical lines by means of a quadrilateral trip region, comprising the steps of:
   deriving from the line current at least two reference signals of at least approximately the same phase;
   deriving from each reference signal and the line voltage a respective difference signal;
   separately comparing each difference signal with a respective correlated threshold phase angle;
   said respective correlated threshold phase angles differing from one another; and
   determining from such comparison whether a fault condition lies within or without the quadrilateral trip region.

6. An apparatus for the distance-selective monitoring of faults at electrical lines by means of a quadrilateral trip region including a resistance boundary and a reactance boundary, comprising:
   means defining a measuring channel for the line current for determining the resistance boundary of the trip region;
   means defining a measuring channel for the line voltage for determining the reactance boundary of the trip region; and
   said means defining the measuring channel for the line current including phase shift means for selectively fixing the phase of reference signals having essentially the same phase.

7. The apparatus as defined in claim 6, wherein:

said means defining the measuring channel for the line current includes circuitry for obtaining reference signals of essentially the same phase from the line current.

8. The apparatus as defined in claim 6, wherein:

said phase shaft means has an output side; and amplitude-determining elements connected to the output side of the phase shift means for obtaining reference signals of essentially the same phase but different amplitude.

9. The apparatus as defined in claim 8, further including:

selection switch means arranged between inputs of the amplitude-determining elements of the reference signals and a multiplicity of current measuring channels each having a related phase shift means for the multiple use of a measuring system having two reference signals of the same phase for different line voltages and line currents.

10. The apparatus as defined in claim 6, further including:

directional measuring means for defining boundary sections of the trip region extending through the null point of an impedance plane of the trip region.

11. An apparatus for the distance-selective monitoring of faults at electrical lines by means of a quadrilateral trip region including a first boundary and a secondary boundary, comprising:

means defining a measuring channel for the line current for forming reference signals of essentially the same phase and determining one of said boundaries of the trip region;

means defining a measuring channel for the line voltage for determining the other of said boundaries of the trip region; and said means defining the measuring channel for the line current including phase shift means for selectively fixing the phase of the reference signals of essentially the same phase.

* * * * *